United States Patent
Yanada et al.

(10) Patent No.: US 7,518,637 B2
(45) Date of Patent: Apr. 14, 2009

(54) IMAGING PROCESSING APPARATUS

(75) Inventors: Takashi Yanada, Hachioji (JP); Akira Ueno, Akiruno (JP)

(73) Assignee: Olympus Corporation, Tokyo (JP)

( * ) Notice: Subject to any disclaimer, the term of this patent is extended or adjusted under 35 U.S.C. 154(b) by 768 days.

(21) Appl. No.: 10/981,545

(22) Filed: Nov. 5, 2004

(65) Prior Publication Data

US 2005/0098711 A1    May 12, 2005

(30) Foreign Application Priority Data

Nov. 10, 2003   (JP)  .............................. 2003-379565

(51) Int. Cl.
*H04N 9/73*    (2006.01)
(52) U.S. Cl. .................... 348/223.1; 348/273; 348/280; 348/319; 348/320
(58) Field of Classification Search ............. 348/223.1, 348/229.1, 208.12, 222.1, 255, 254, 319, 348/280; 250/208.1; 382/167

See application file for complete search history.

(56) References Cited

U.S. PATENT DOCUMENTS

| | | | | |
|---|---|---|---|---|
| 5,278,660 A | * | 1/1994 | Sugiki | 348/305 |
| 5,428,389 A | * | 6/1995 | Ito et al. | 348/231.6 |
| 5,548,699 A | * | 8/1996 | Ishida et al. | 345/440 |
| 5,581,298 A | * | 12/1996 | Sasaki et al. | 348/222.1 |
| 5,748,307 A | * | 5/1998 | Nakamura et al. | 358/296 |
| 6,567,123 B1 | * | 5/2003 | Hashimoto | 348/229.1 |

FOREIGN PATENT DOCUMENTS

JP          11-239291       8/1999

* cited by examiner

*Primary Examiner*—Tuan V Ho
*Assistant Examiner*—Antoinette T Spinks
(74) *Attorney, Agent, or Firm*—Westerman, Hattori, Daniels & Adrian, LLP.

(57) ABSTRACT

An imaging processing apparatus for effecting imaging processing on imaging signals inputted from an imaging device having a plurality of pixels arranged on a plane and having color filters attached on an imaging surface, the imaging processing apparatus having: a region determining unit, a first retaining unit, a second retaining unit, a switching unit, and an accumulation unit.

6 Claims, 7 Drawing Sheets

| | | | |
|---|---|---|---|
| LINE 1 | G Y G Y G Y | | |
| LINE 2 | C M C M C M | | |
| LINE 3 | G Y G Y G Y | | |
| LINE 4 | C M C M C M | | |
| LINE 5 | G Y G Y G Y | | |
| LINE 6 | C M C M C M | | |

US 7,518,637 B2

IMAGING PROCESSING APPARATUS

This application claims benefit of Japanese Patent Application No. 2003-379565 filed in Japan on Nov. 10, 2003, the contents of which are incorporated by this reference.

BACKGROUND OF THE INVENTION

The present invention relates to imaging processing apparatus for effecting signal processing of image signals outputted from an imaging device, and more particularly relates to an imaging processing apparatus for effecting such imaging adjustments as automatic exposure adjustment and white balance adjustment.

Those imaging apparatus such as digital cameras where imaging signals obtained by using an imaging device, such as CCD or CMOS are converted into digital signals and are then subjected to signal processing are generally provided with functions for effecting for example automatic exposure control (hereinafter abbreviated as AE), automatic focus control (hereinafter abbreviated as AF), and automatic white balance adjustment (hereinafter abbreviated as AWB) for the obtained imaging signals so that the photographer can take pictures under an optimum condition.

In the above described imaging processing of the imaging apparatus, predetermined regions of an imaging frame are respectively set as photometric area and focus area to detect the imaging signals in the regions. Based on the result of such detection, the imaging apparatus is then adjusted to an optimum condition in taking images. For example, AE control is to obtain and effect an optimum exposure amount with setting diaphragm or the like based on an evaluation value obtained by integrating output color signal components of the imaging device, and AWB control is to correct color balance by correlating the respective colors based on an evaluation value as described.

Figure 1:
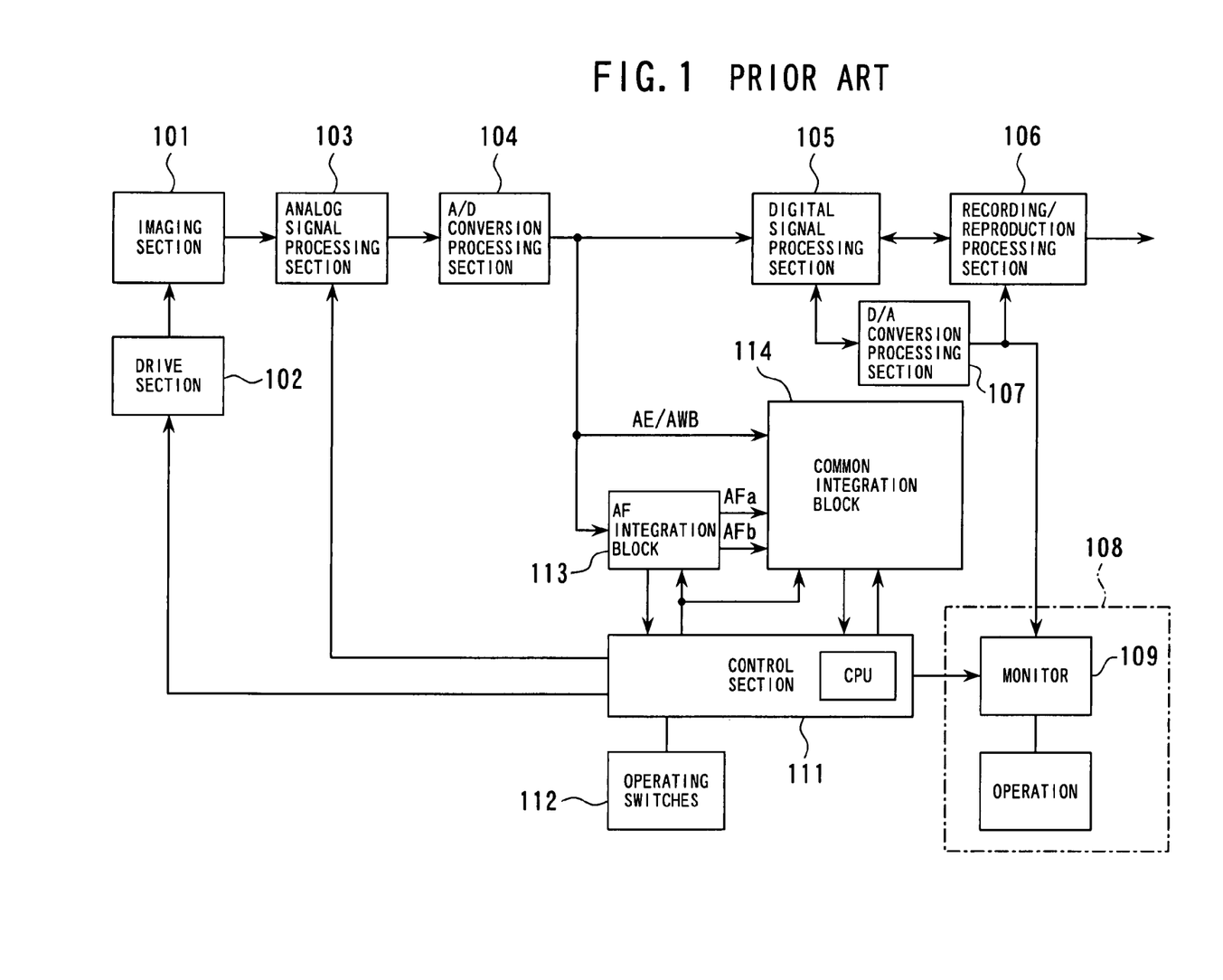
FIG. 1 is a block diagram showing an example of construction of the conventional imaging processing apparatus.

An imaging processing apparatus of the construction as will be shown in the following has been proposed for example in Japanese Patent Application Laid-Open Hei-11-239291 as the imaging processing apparatus using a technique for achieving the above described control. FIG. 1 is a block diagram showing construction of the imaging processing apparatus as disclosed in the publication. Referring to FIG. 1, an imaging section 101 includes an optical unit comprised for example of lens and solid-state imaging device, a drive circuit for driving the solid-state imaging device, and a drive mechanism for moving lens and diaphragm to a predetermined position. A drive section 102 is a means for generating for example drive signals for adjusting the aperture of diaphragm and drive signals for driving the solid-state imaging device. An analog signal processing section 103 is a means for clamping and amplifying imaging signals outputted from the imaging section 101 to output them as image signals. An A/D conversion processing section 104 is for converting the image signals consisting of analog signals into digital signals, and a digital signal processing section 105 is for effecting for example γ processing on the digital image signals.

A recording/reproduction processing section 106 is to record the image signals for example into a memory card and to effect reproduction thereof. D/A conversion processing section 107 is a means for converting digital signals into analog signals to provide a visible displaying thereof-on a monitor 109 of display section 108. Numeral 111 denotes a control section such as of CPU and 112 denotes operating switches. AF integration block 113 is a means for computing an AF evaluation value. A common integration block 114 is a means for computing an evaluation value for use in AE/AWB control and, in some modes, an evaluation value for effecting AF, internally including an integrating section for dividing an image into a plurality of blocks to integrate an evaluation value and a memory for retaining the result of the integration.

An operation of thus constructed imaging processing apparatus will now be described. The imaging signals obtained from the imaging section 101 go through the analog signal processing section 103, are converted into digital signals by the A/D conversion processing section 104, and are inputted into the digital signal processing section 105. The image signals from the digital signal processing section 105 are recorded into a memory card through the recording/reproduction processing section 106 or displayed on the monitor 109 of display section 108 according to an instruction given from the operation switches 112. Further, the image signals from the A/D conversion section 104 are inputted also into the AF integration block 113 and common integration block 114. At the common integration block 114, the inputted image is divided into a plurality of blocks, and is integrated block by block to generate an evaluation value. The generated evaluation value is transferred for example through an internal bus to the control section 111 where control signals to the drive section 102 are generated.

Figure 2:
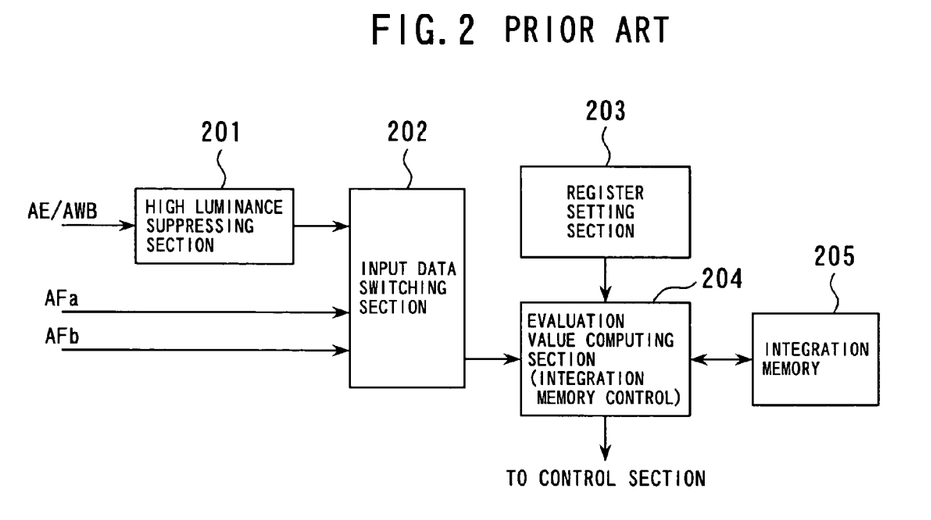
FIG. 2 shows construction of a common operation block in the conventional example shown in FIG. 1.
Figure 3:
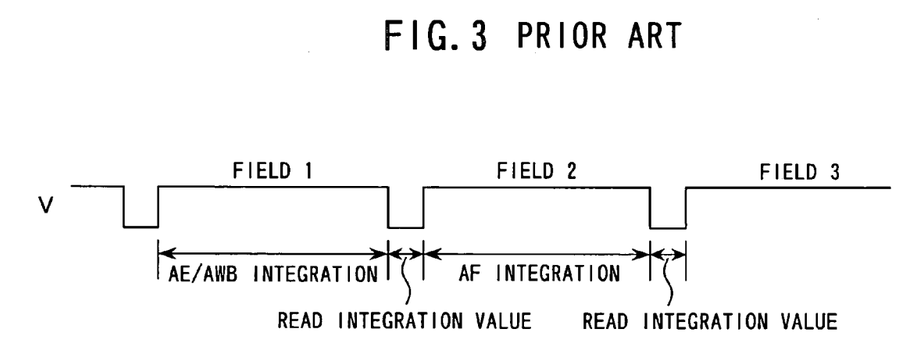
FIG. 3 is a timing chart for explaining operation of the conventional example shown in FIG. 1.

FIG. 2 is a block diagram showing construction of the common integration block 114. Further, FIG. 3 is a timing chart for explaining operation of the common integration block 114. Referring to FIG. 2, a high luminance suppressing section 201 is a circuit for effecting for example knee processing on the output of the A/D conversion processing section 104 of FIG. 1. Inputted respectively to the input of an input data switching section 202 are the result of the processing at the high luminance suppressing section 201, and integration results AFa, AFb of the AF integration block 113 of FIG. 1. The input data switching section 202 switches from operation of each evaluation value to another at each field so as to make desired operation possible in such a manner as shown in FIG. 3 that AE/AWB integration for example is effected in a first field and AF integration in a second. A register setting section 203 is to set an area to be integrated. An evaluation value computing section 204 effects integration processing and retains values in the course of the integration and an integration result to an integration memory 205. Further, operation results (evaluation value) at the evaluation value computing section 204 are read out to the control section 111 when operation of each field is completed. The control section 111 then generates control signals for AE/AWB processing based on the evaluation values obtained by computation.

SUMMARY OF THE INVENTION

It is an object of the present invention to provide an imaging processing apparatus in which memory to be used in the accumulation processing for obtaining evaluation values for controlling for example AE, AWB is reduced. It is another object of the invention to provide an imaging processing apparatus in which, at the same time of completion of the inputting of one field image, an evaluation value for AWB control thereof can be obtained by a control section.

In a first aspect of the invention, there is provided an imaging processing apparatus for effecting imaging processing on imaging signals inputted from an imaging device having a plurality of pixels arranged on a plane and having color filters attached on an imaging surface, including: a region determining means for determining a region for generating evaluation values for determining image taking conditions with respect to the imaging signals and for dividing the determined region into a plurality of regions; a first retaining means for retaining for each divided region color-by-color accumulation results of the imaging signals inputted in odd-number horizontal lines; a second retaining means for retaining for each divided region color-by-color accumulation results of the imaging signals inputted in even-number horizontal lines; a switching means for alternately switching connection from an external connection terminal thereof to the first retaining means or the second retaining means at each horizontal synchronizing period; and an accumulation means having an output terminal thereof connected to the external connection terminal of the switching means, for accumulating for each divided region and for each color the imaging signals inputted in a horizontal line, and for providing an output by further adding to the accumulation results thereof color-by-color accumulation results of the corresponding divided region read out from the first or second retaining means connected thereto through the switching means.

In a second aspect of the invention, the accumulation means of the imaging processing apparatus according to the first aspect reads accumulation results from one retaining means different from the other retaining means of the first or second retaining means having been subject to accumulation every time when accumulating addition corresponding to one line in the horizontal direction of the divided region is completed.

In a third aspect of the invention, the imaging processing apparatus according to the first or second aspect further includes a computation means for generating an evaluation value for effecting white balance processing. The computation means, when color-by-color accumulation results of the imaging signals inputted in even-number horizontal lines of the divided region have been determined, effects computation using the results of the accumulating addition thereof and the accumulation results in odd-number horizontal lines retained at the first retaining means.

In a fourth aspect of the invention, the imaging processing apparatus according to the second aspect further includes a computation means for generating an evaluation value for effecting white balance processing, and a third retaining means for retaining an identical content as the first retaining means. The computation means, when color-by-color accumulation results of the imaging signals inputted in even-number horizontal lines of the divided region have been determined, effects computation using the accumulation results thereof and the accumulation results in odd-number horizontal lines retained at the third retaining means.

DESCRIPTION OF THE PREFERRED EMBODIMENTS

Some embodiments will be described in the following.

First Embodiment

Figure 4:
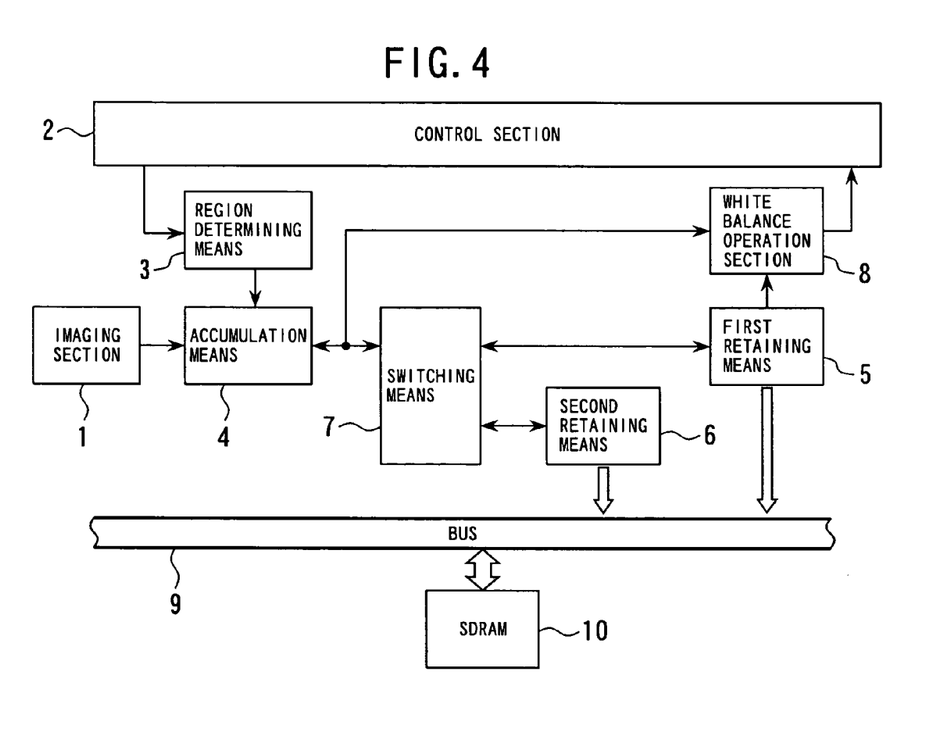
FIG. 4 is a block diagram showing construction of a first embodiment of the imaging apparatus according to the present invention.
Figure 5:
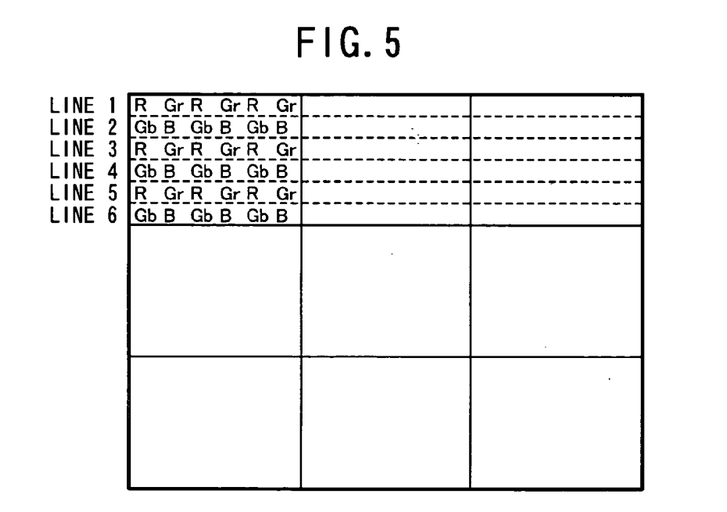
FIG. 5 shows an example of how to divide one frame of imaging signals in the case of a primary color filter through the region determining means in the first embodiment shown in FIG. 4.

The construction of a first embodiment of the imaging processing apparatus according to the invention will now be described by way of the block diagram shown in FIG. 4. Referring to FIG. 4, an imaging section 1 includes an optical unit comprised for example of lens and solid-state imaging device, a drive circuit for driving the solid-state imaging device, and a drive mechanism for moving lens and diaphragm to a predetermined position. The imaging device is for example CCD imaging device having an imaging surface on which R, G, B primary-color filters are disposed pixel by pixel in an arrangement as shown in FIG. 5. A control section 2 such as of CPU controls operation of each section. A region determining means 3 divides the imaging signals of one frame into a plurality of regions in order to effect AE processing. An accumulation means 4 effects accumulation processing for each color of the imaging signals inputted from the imaging section 1 in the regions determined by the region determining means 3.

A first retaining means 5 retains the result of accumulation by the accumulation means 4 in odd-number lines. A second retaining means 6 retains the result of accumulation in even-number lines. A switching means 7 switches at each horizontal synchronizing period as to at which one of the first retaining means 5 or the second retaining means 6 the result of accumulation at the accumulation means 4 is to be retained. Numeral 8 denotes a white balance operation means. The white balance operation means 8 determines whether ratio of color-by-color accumulation results falls under a certain range in each divided region or not. It then extracts only those divided regions with such ratio falling under the certain range to generate an evaluation value for effecting white balance control. A bus 9 transfers the results accumulated by the accumulation means 4 from the first and second retaining means 5, 6; and SDRAM 10 retains the accumulation result transferred through the bus 9.

FIG. 5 shows an example of division of the imaging signals of one frame in the present embodiment. In the dividing example shown in FIG. 5, one frame is divided into 3×3 regions where each divided region consists of six lines. Here, what corresponds to one line in the horizontal direction of each divided region is defined as a divided line.

Figure 6:
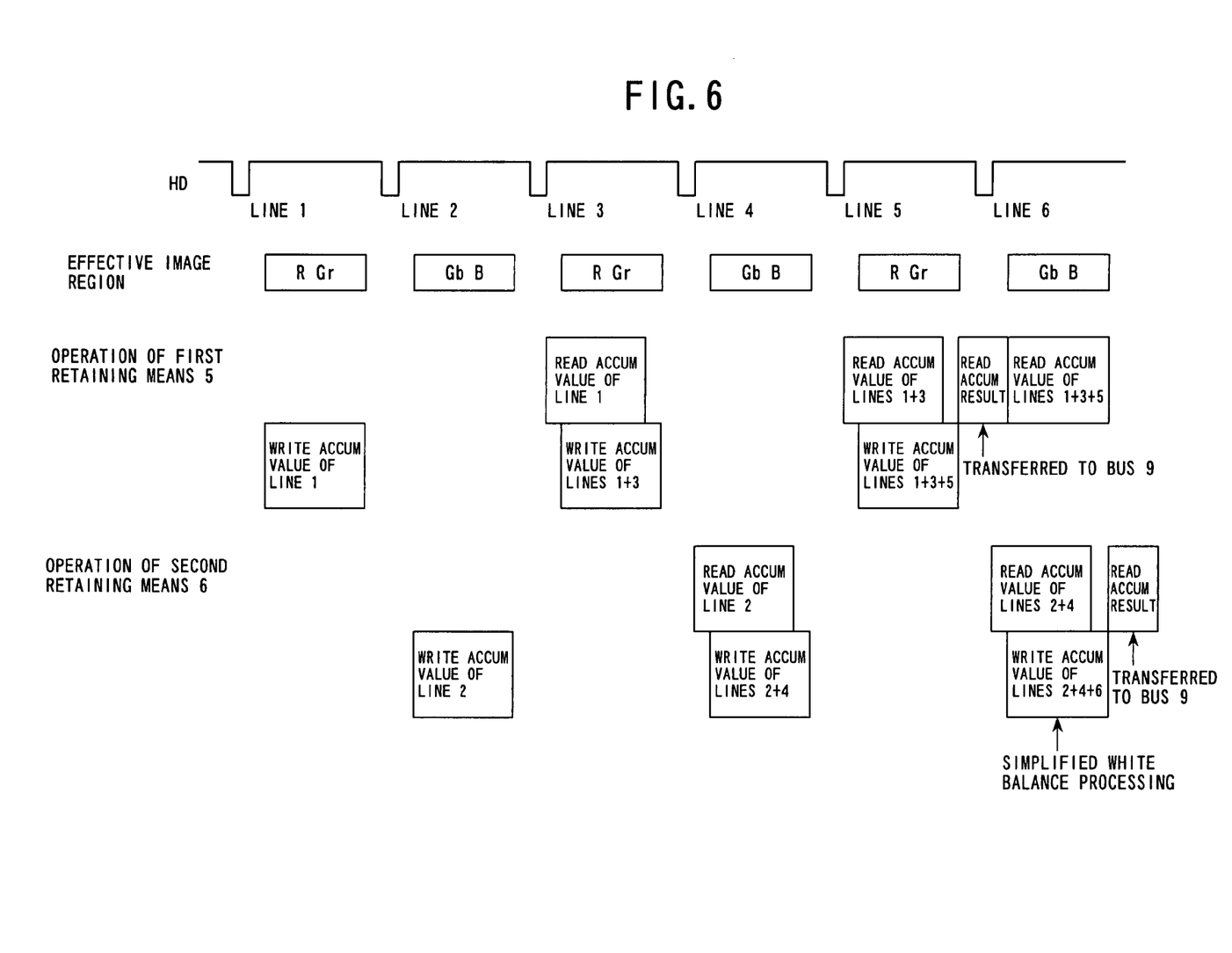
FIG. 6 is a timing chart for explaining operation of the first embodiment shown in FIG. 4.

An operation of the present embodiment will now be described with reference to the operation timing chart of FIG. 6. The imaging signals obtained from the imaging section 1 are divided into regions for example as shown in FIG. 5 by the region determining means 3 and are accumulated color by color in each region at the accumulation means 4. The imaging signals outputted from the imaging section 1 are inputted into the accumulation means 4 so that the colors to be inputted for each line are alternated for example between R-Gr and Gb-B as shown in FIG. 5. In FIG. 6, HD denotes the horizontal synchronizing signal.

In line 1 of each divided region, R and Gr are inputted. The accumulation means 4 effects accumulation processing for each color of line 1 in each divided region with respect to the signals inputted from the imaging section 1 and writes and stores accumulation values of line 1 into the first retaining means 5. In line 2, Gb and B are inputted. The accumulation means 4 effects accumulation processing for each color of line 2 in each divided region with respect to the signals inputted from the imaging section 1 and writes and stores accumulation values thereof into the second retaining means 6.

In line 3, R and Gr are inputted, and the accumulation means 4 reads the accumulation values of line 1 from the first retaining means 5 through the switching means 7 and accumulates them together with the input signals of line 3. The result thereof is stored into the first retaining means 5 through the switching means 7. Accordingly, accumulation values of line 1+line 3 are stored into the first retaining means 5. In line 4, Gb and B are inputted, and the accumulation means 4 reads the accumulation values of line 2 from the second retaining means 6 through the switching means 7 and accumulates them together with the input signals of line 4. The result thereof is stored into the second retaining means 6 through the switching means 7. Accordingly, accumulation values of line 2+line 4 are stored into the second retaining means 6.

Similarly in line 5, the accumulation means 4 reads the accumulation values of line 1+line 3 from the first retaining means 5 through the switching means 7 so that accumulation values of line 1+line 3+line 5 are stored into the first retaining means 5. Further, since line 5 is the last horizontal line of a divided region where R and Gr are inputted, accumulation results of R and Gr of each divided region are determined. These accumulation results are transferred to SDRAM 10 through bus 9 after the completion of the accumulation processing of line 5. The transferred accumulation result of odd-number lines is used as an evaluation value for effecting AE processing.

Similarly in line 6, the accumulation means 4 reads the accumulation values of line 2+line 4 from the second retaining means 6 through the switching means 7 so that accumulation values of line 2+line 4+line 6 are stored into the second retaining means 6. Further, since line 6 is the last horizontal line in a divided region where Gb and B are inputted, accumulation results of Gb and B of each divided region are determined. These accumulation results are transferred to SDRAM 10 through bus 9 after the completion of the accumulation processing of line 6. The transferred accumulation result is used as an evaluation value for effecting AE processing.

Further, the generation of an evaluation value of AWB processing by the white balance operation means 8 is effected by reading accumulation values retained in the first retaining means 5 at the time of accumulation processing of line 6 by the accumulation means 4 in FIG. 6. In particular, at the same time when the accumulation results of Gb and B (line 2+line 4+line 6) in each divided region are determined by the accumulation processing of line 6 and the accumulation values thereof are inputted into the white balance operation means 8, the accumulation values of R and Gr of corresponding divided region are read out to the white balance operation means 8 from the first retaining means 5. An evaluation value for use in AWB processing is thereby generated for each divided region at the white balance operation means 8 based on the accumulation results of R, Gr, Gb, B. It should be noted that similar processing is effected in the accumulation processing of the imaging signals in lines 7 to 12 which constitute the next divided region, and in the divided regions thereafter.

According to the present embodiment, since the imaging processing apparatus reads accumulation values of odd-number lines and even-number lines through the internal bus by each divided line from the first and second retaining means 5, 6, memory capacity can be reduced as compared to the case of retaining accumulation value corresponding to one field, and the accumulation values can be retained by two memories each corresponding to one line. Further, since the generation of evaluation value is effected at the white balance operation means 8, a load on the control section 2 can be reduced. Furthermore, since the white balance operation means 8 is designed to compute an evaluation value for effecting AWB processing from the accumulation values of divided blocks of which the accumulation processing has been completed, it is possible to obtain an evaluation value at the same time of the completion of the inputting of one field image.

Figure 7:
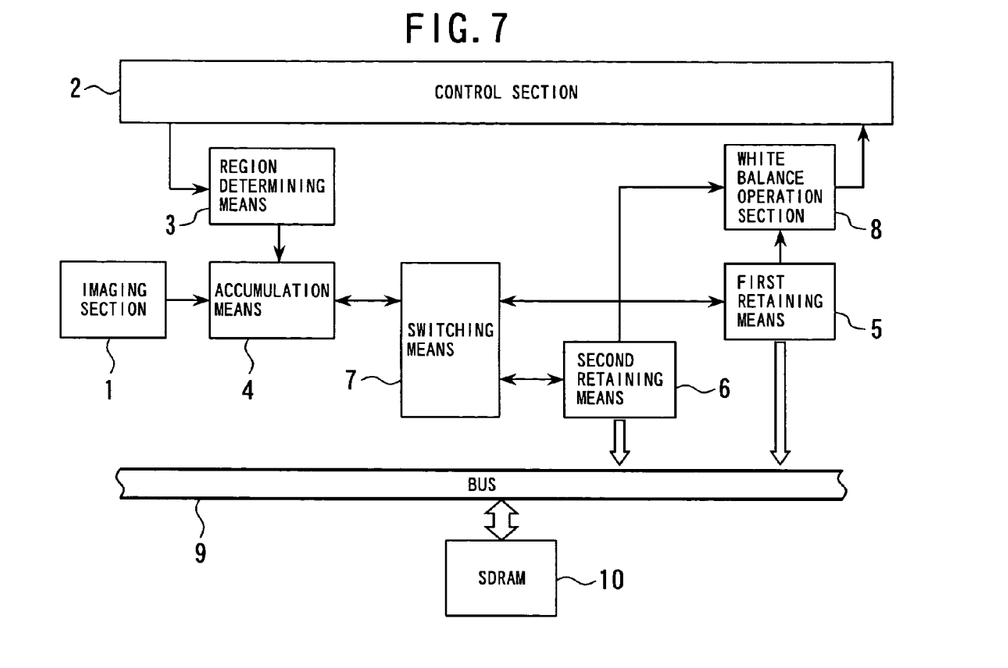
FIG. 7 is a block diagram showing a modification of the first embodiment shown in FIG. 4.

FIG. 7 is a block diagram showing a modification of the first embodiment shown in FIG. 4. In this modification, the generation of an evaluation value for use in white balance operation at the white balance operation means 8 is effected by using the accumulation values retained at the first retaining means 5 and at the second retaining means 6. If the accumulation results retained at the first retaining means 5 are used in generating an evaluation value for AWB processing by the white balance operation means 8, there is a possibility of the following problem. In particular, a normal readout cannot be effected in some cases due to an overlap of the timing at which accumulation values are read out from the first retaining means 5 to SDRAM 10 through the internal bus 9 when the accumulation processing of line 5 is completed, and the timing at which the white balance operation means 8 reads accumulation values for use in the generation of an evaluation value from the first retaining means 5 to generate an evaluation value for AWB processing. By using the accumulation values retained at the second retaining means 6 as in the present modification, it is possible to give a priority to the readout to SDRAM 10 at the above described timing and to effect the processing of an evaluation value generation by the white balance operation means 8 at a different timing.

Second Embodiment

Figure 8:
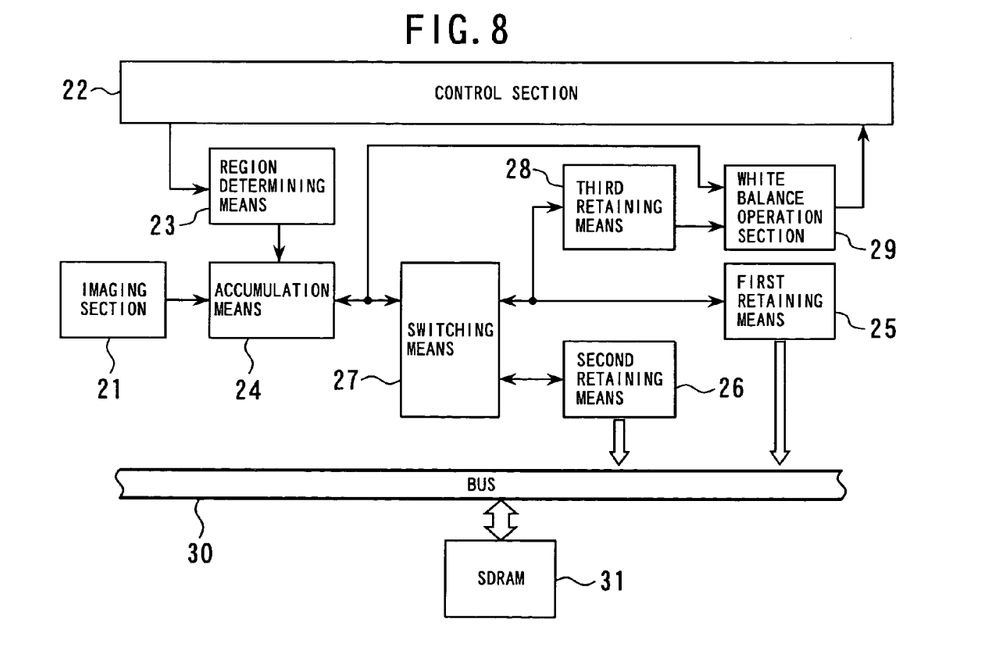
FIG. 8 is a block diagram showing construction of a second embodiment of the invention.

A second embodiment of the invention will now be described. FIG. 8 is a block diagram showing construction of the imaging processing apparatus according to the second embodiment of the invention. Referring to FIG. 8, an imaging section 21 includes an optical unit comprised for example of lens and solid-state imaging device, a drive circuit for driving the solid-state imaging device, and a drive mechanism for moving lens and diaphragm to a predetermined position. A control section 22 such as of CPU controls operation of each section. A region determining means 23 divides one frame into a plurality of regions in order to effect AE processing. An accumulation means 24 effects accumulation processing for each color of the imaging signals inputted from the imaging section 21 in the regions determined by the region determining means 23.

A first retaining means 25 retains the result of accumulation in odd-number lines. A second retaining means 26 retains the result of accumulation in even-number lines. A switching means 27 switches as to at which one of the first retaining mans 25 or the second retaining means 26 the result of accumulation is to be retained. Numeral 28 denotes a third retaining means at which identical accumulation results as the first retaining means 25 are retained. Numeral 29 denotes a white balance operation means. The white balance operation means 29 determines whether ratio of color-by-color accumulation results falls under a certain range in each divided region or not. It then extracts only those divided regions with such ratio falling under the certain range to effect generation operation processing of an evaluation value for effecting white balance control. A bus 30 transfers the results accumulated by the accumulation means 24 from the first and second retaining means 25, 26; and SDRAM 31 retains the accumulation result transferred through the bus 30.

An example of operation of the present embodiment will now be described with reference to FIG. 8 and the timing chart of FIG. 9. The color-by-color accumulation processing and the storing operation to the first and second retaining means 25, 26 in lines 1 to 4 shown in FIG. 5 are identical to the first embodiment shown in FIG. 4. In line 5, accumulation values of line 1+line 3+line 5 are stored into the first retaining means 25. Further, since line 5 is the last horizontal line in a divided region where R and Gr are inputted, accumulation results of R and Gr in each divided region are determined. These accumulation results of odd-number lines are transferred from the first retaining means 25 to SDRAM 31 through the internal bus 30 after the completion of the accumulation processing of line 5. The transferred accumulation results of odd-number lines are used as evaluation value for effecting AE processing. Further, at this time, the same content as the content retained at the first retaining means 25 (accumulation values of line 1+line 3+line 5) is stored also into the third retaining means 28.

Similarly in line 6, accumulation values of line 2+line 4 are read out from the second retaining means 26, and accumulation values of line 2+line 4+line 6 are stored into the second retaining means 26. Further, since line 6 is the last horizontal line in a divided region where Gb and B are inputted, accumulation results of Gb and B of each divided region are determined. These accumulation results are transferred from the second retaining means 26 to SDRAM 31 through bus 30 after the completion of the accumulation processing of line 6. The transferred accumulation results are used as evaluation value for effecting AE processing.

Figure 9:
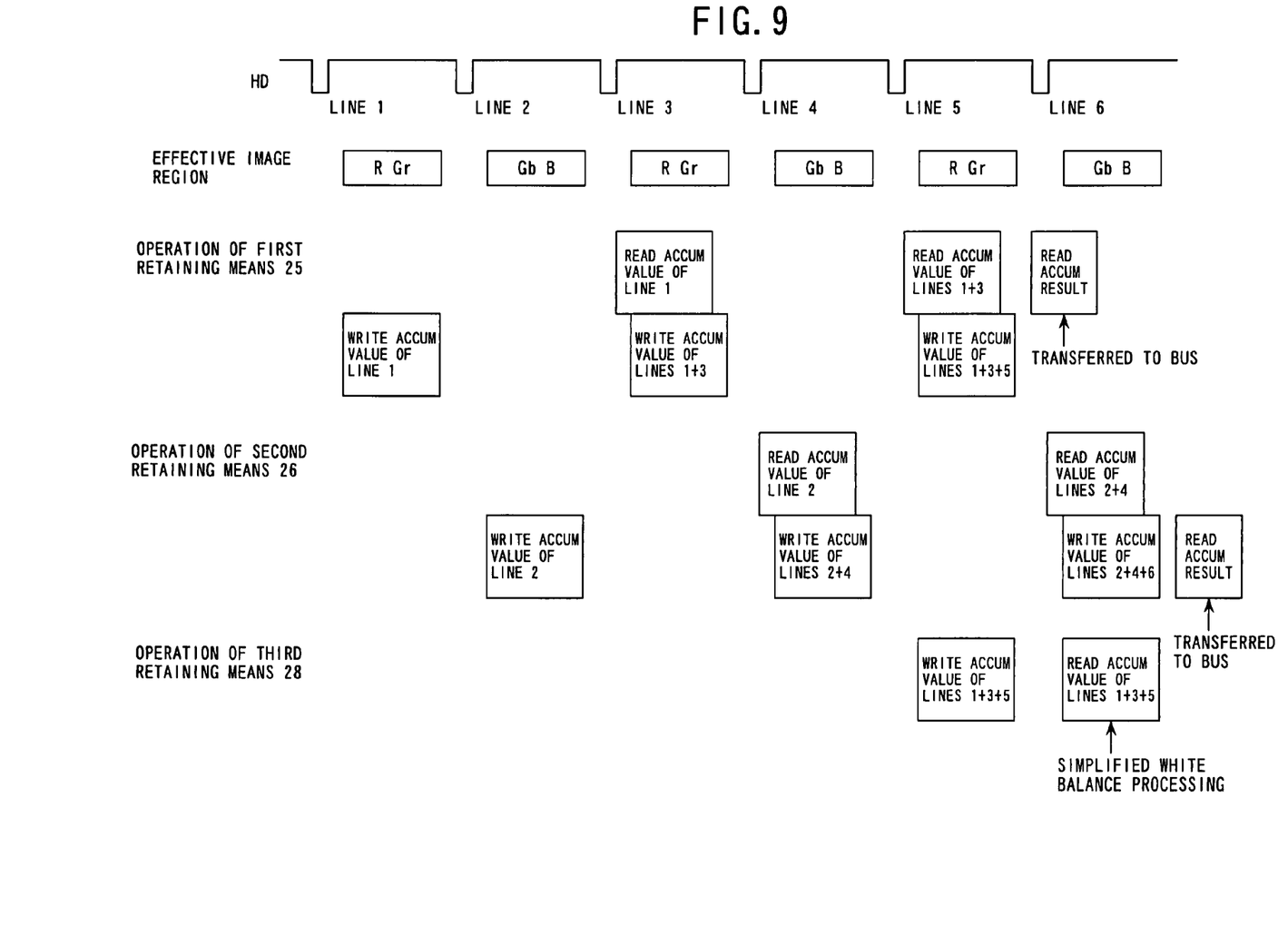
FIG. 9 is a timing chart for explaining operation of the second embodiment shown in FIG. 8.

The generation of an evaluation value of AWB processing by the white balance operation means 29 is effected by reading accumulation values retained at the third retaining means 28 at the time of the accumulation processing of line 6 by the accumulation means 24 in FIG. 9. In particular, at the same time when the accumulation results of Gb and B (accumulation values of line 2+line 4+line 6) in each divided region are determined by the accumulation processing of line 6 and such accumulation values are inputted into the white balance operation means 29, the accumulation values of R and Gr of corresponding divided region are read out to the white balance operation means 29 from the third retaining means 28. An evaluation value for use in AWB processing is thereby generated for each divided region at the white balance operation means 29 based on the accumulation results of R, Gr, Gb, B.

If the accumulation results retained at the first retaining means 25 are used at the time of the generation of an evaluation value for AWB processing by the white balance operation means 29, there is, as previously described, a possibility of the following problem. In particular, a normal readout cannot be effected in some cases due to an overlap of the timing at which accumulation values are read out from the first retaining means 25 to SDRAM 31 through bus 30 when the accumulation processing of line 5 is completed, and the timing at which the white balance operation means 29 reads accumulation values for an evaluation value generation from the first retaining means 25 to generate an evaluation value for computing AWB. By providing the third retaining means 28 for the white balance operation means 29 as in the present embodiment, a normal operation can be effected even at the above described timings.

While an example where R, Gr are inputted in odd-number lines and Gb, B are inputted in even-number lines has been shown in the description of the above embodiments, it is also possible that Gb, B be inputted in odd-number lines and R, Gr be inputted in even-number lines. The operation is not limited by the arrangement of color filters for each pixel in the imaging device.

Figure 10:
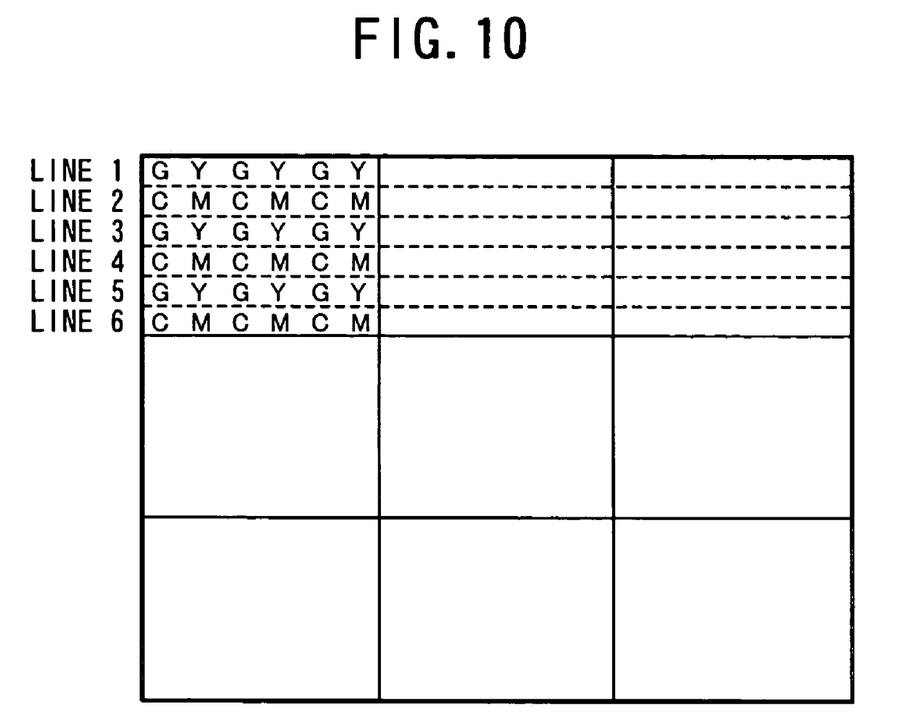
FIG. 10 shows an example of how to divide one frame of imaging signals in the case of a complementary-color filter.

Further, while an example of disposing a primary-color filter on the imaging device has been shown in the above embodiments, a similar processing can be effected also by disposing a complementary-color type filter consisting of green (G), yellow (Y), cyan (C), magenta (M) as shown in FIG. 10. Furthermore, methods of dividing the imaging signals of one frame include but not specifically limited to: the method of dividing the entire region into those of equal size as shown in FIGS. 5 and 10; and the method of dividing into regions of unequal sizes.

As has been described by way of the above embodiments, with the imaging processing apparatus according to the first aspect of the invention, the imaging signals are divided into a plurality of regions, and color-by-color accumulation values are obtained for each divided region. At that time, accumulation values in odd-number horizontal lines are retained at the first retaining means and accumulation values in even-number horizontal lines at the second retaining means with effecting switching at each horizontal synchronizing period. It is thereby possible to reduce memory for retaining the accumulation values.

With the imaging processing apparatus according to the second aspect, the accumulation values of odd-number horizontal lines retained at the first retaining means are read out by a read means when the accumulating operation in an even-number horizontal line of the divided region is completed, and the accumulation values of even-number horizontal lines retained at the second retaining means are read out by the read means when the accumulating operation in an odd-number horizontal line of the divided region is completed. It is thereby possible to reduce time required for the readout.

The imaging processing apparatus according to the third aspect further includes an operation means for generating an evaluation value for effecting white balance processing wherein an evaluation value for effecting white balance processing is computed and generated using the accumulation result of even-number horizontal lines in each divided region and the accumulation result of odd-number horizontal lines retained at the first retaining means. It is thereby possible to reduce processing by CPU.

The imaging processing apparatus according to the fourth aspect further includes an operation means for generating an evaluation value for effecting white balance processing and a third retaining means for retaining identical values as the first retaining means, wherein the operation means computes and generates an evaluation value for effecting white balance processing using the accumulation result of even-number horizontal lines in each divided region and the accumulation result of odd-number horizontal lines retained at the third retaining means. It is thereby possible that, even when an overlap occurs of the timings at which the read means reads an accumulation value from the first retaining means and at which the operation means reads an accumulation value from the third retaining means, the processings can be effected in parallel to each other.

What is claimed is:

1. An imaging processing apparatus for effecting imaging processing on imaging signals inputted from an imaging device having a plurality of pixels arranged on a plane and having color filters attached on an imaging surface, said imaging processing apparatus comprising:
- a region determining means for determining a region for generating evaluation values for determining image taking conditions with respect to the imaging signals and for dividing the determined region into a plurality of regions;
- a first retaining means for retaining for each divided region color-by-color accumulation results of the imaging signals inputted in odd-number horizontal lines;
- a second retaining means for retaining for each divided region color-by-color accumulation results of the imaging signals inputted in even-number horizontal lines;
- a switching means for alternately switching connection from an external connection terminal thereof to said first retaining means or second retaining means at each horizontal synchronizing period; and
- an accumulation means having an output terminal thereof connected to the external connection terminal of the switching means, for accumulating for each divided region and for each color the imaging signals inputted in a horizontal line, and for providing an output by further adding to the accumulation results thereof color-by-color accumulation results of the corresponding divided region read out from said first or second retaining means connected thereto through said switching means.

2. The imaging processing apparatus according to claim 1, wherein said accumulation means reads accumulation results from one of the retaining means different from the other retaining means of said first or second retaining means having been subject to accumulation every time when accumulating addition corresponding to one line in the horizontal direction of said divided region is completed.

3. The imaging processing apparatus according to claim 1 further comprising a computation means for generating an evaluation value for effecting white balance processing, wherein the computation means, when color-by-color accumulation results of the imaging signals inputted in even-number horizontal lines of said divided region have been determined, effects computation using the results of the accumulating addition thereof and the accumulation results in odd-number horizontal lines retained at said first retaining means.

4. The imaging processing apparatus according to claim 2 further comprising a computation means for generating an evaluation value for effecting white balance processing, wherein the computation means, when color-by-color accumulation results of the imaging signals inputted in even-number horizontal lines of said divided region have been determined, effects computation using the results of the accumulating addition thereof and the accumulation results in odd-number horizontal lines retained at said first retaining means.

5. The imaging processing apparatus according to claim 2 further comprising a computation means for generating an evaluation value for effecting white balance processing, and a third retaining means for retaining an identical content as said first retaining means, wherein said computation means, when color-by-color accumulation results of the imaging signals inputted in even-number horizontal lines of said divided region have been determined, effects computation using the accumulation results thereof and the accumulation results in odd-number horizontal lines retained at said third retaining means.

6. An imaging processing apparatus for effecting imaging processing on imaging signals inputted from an imaging device having a plurality of pixels arranged on a plane and having color filters attached on an imaging surface, said imaging processing apparatus comprising:
- a region determining section for determining a region for generating evaluation values for determining image taking conditions with respect to the imaging signals and for dividing the determined region into a plurality of regions;
- a first memory for retaining for each divided region color-by-color accumulation results of the imaging signals inputted in odd-number horizontal lines;
- a second memory for retaining for each divided region color-by-color accumulation results of the imaging signals inputted in even-number horizontal lines;
- a switch for alternately switching connection from an external connection terminal thereof to said first memory or second memory at each horizontal synchronizing period; and
- an accumulator having an output terminal thereof connected to the external connection terminal of the switch, for accumulating for each divided region and for each color the imaging signals inputted in a horizontal line, and for providing an output by further adding to the accumulation results thereof color-by-color accumulation results of the corresponding divided region read out from said first or second memory connected thereto through said switch.

* * * * *